United States Patent
Kanayama et al.

(10) Patent No.: US 6,734,912 B1
(45) Date of Patent: May 11, 2004

(54) TV LENS SYSTEM

(75) Inventors: Atsushi Kanayama, Omiya (JP); Hiroyuki Kawamura, Omiya (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/459,884

(22) Filed: Dec. 14, 1999

(30) Foreign Application Priority Data

Dec. 14, 1998 (JP) .......................................... 10-355005

(51) Int. Cl.⁷ .......................... H04N 5/225; H04N 5/228
(52) U.S. Cl. ...................... 348/361; 348/222.1; 396/71; 396/532
(58) Field of Search .................. 396/71, 297, 298, 396/299, 529, 530, 532; 348/335, 340, 360, 361, 373, 375, 376, 222.1, 362, 363, 364; H04N 5/228, 5/225

(56) References Cited

U.S. PATENT DOCUMENTS

| | | | | |
|---|---|---|---|---|
| 5,087,978 A | * | 2/1992 | Hieda | 348/363 |
| 5,168,365 A | * | 12/1992 | Kawahara | 348/364 |
| 5,731,920 A | * | 3/1998 | Katsuragawa | 359/827 |
| 5,739,854 A | * | 4/1998 | Nishikawa | 348/335 |
| 5,877,811 A | * | 3/1999 | Iijima et al. | 348/375 |
| 6,130,717 A | * | 10/2000 | Arai et al. | 348/360 |
| 6,336,754 B1 | * | 1/2002 | Sato et al. | 396/529 |
| 6,407,774 B1 | * | 6/2002 | Mabuchi et al. | 348/335 |

FOREIGN PATENT DOCUMENTS

| | | | | |
|---|---|---|---|---|
| JP | 11-271866 | | 8/1999 | G03B/17/14 |
| JP | 11098198 A | | 9/1999 | H04L/25/02 |
| JP | 11-258482 A | | 9/1999 | G02B/7/10 |

* cited by examiner

Primary Examiner—Ngoc-Yen Vu
(74) Attorney, Agent, or Firm—Birch, Stewart, Kolasch & Birch, LLP

(57) ABSTRACT

In a TV lens system including a TV lens apparatus and a control unit, CPUs of the TV lens apparatus and the control unit monitor intervals between received data in serial communication in a digital control mode. If the data transmission stops for a predetermined time or the received data has an error, the CPUs determine that the communication is abnormal and switch the control modes of the TV lens system from the digital control mode to an analog control mode by operating switching devices. Display units show that the system has been switched to the analog control mode. If the CPUs detect the communication being abnormal, they may display abnormality of the communication on the display units to inform the user of the abnormality of the communication so that the user can switch the control modes by manually operating analog setting switches. Information indicating the abnormality of the communication is stored in an EEPROM, and presented to the user when the TV lens system starts to operate afterward.

26 Claims, 4 Drawing Sheets

TV LENS SYSTEM

BACKGROUND OF THE INVENTION

1. Field of the Invention

The present invention relates generally to a TV lens system, and more particularly to a TV lens system having an analog control mode with an analog control system and a digital control mode using a serial communication function in order to transmit signals between a lens apparatus, a lens drive apparatus and a control unit for controlling them.

2. Description of Related Art

A television (TV) lens apparatus for a TV camera has a serial communication function for transmitting and receiving plural pieces of information on one line in a digital serial communication or a analog communication function for transmitting and receiving plural pieces of information with low level signals and high level signals or analog voltage signals (hereinafter referred to as analog signals) on a plurality of lines according to types of information. In view of this, there have already been proposed an automatic determination apparatus for detecting the presence of the serial communication to enable the TV lens system to operate in both analog and digital signal systems (Japanese Patent Application No. 9-257024) and a TV lens apparatus and a TV lens control unit capable of operating in both systems (Japanese Patent Application No. 10-63025, and Japanese Patent Application No. 10-74019, which corresponds to U.S. patent application Ser. No. 09/275,189 assigned to the assignee of the present application).

The conventional TV lens system having an analog control system (an analog control mode) and a serial communication function (a digital control mode) is normally controlled in the digital control mode, which ensures various functions. If, however, the transmission and reception of data in the serial communication becomes impossible for some reasons, the entire system is suspended completely and cannot be used.

SUMMARY OF THE INVENTION

It is therefore an object of the present invention to provide a TV lens system that prevents the complete suspension and can be used continuously even if the operation in the digital control mode becomes impossible.

The above object can be achieved by providing a TV lens system, comprising: a lens drive that drives a TV lens apparatus, the lens drive operating in control modes including an analog control mode and a digital control mode; a communication monitor that monitors communication of the lens drive in the digital control mode; and a switching device that switches the control modes of the lens drive from the digital control mode to the analog control mode if the communication monitor detects the communication being abnormal.

More specifically, the TV lens system of the present invention has the control function for both the analog control mode and the digital control mode. If the system is set in the digital control mode, the signals (or data) are transmitted between the lens control unit and the lens apparatus or the lens drive by way of communication in the digital control mode. The transmission of the data by way of communication controls the lens. The communication monitor monitors the state of the communication in the digital control mode to determine whether the communication is normal or abnormal. If the communication monitor detects the communication being abnormal, the switching device switches the mode to the analog control mode. Thus, the system can be used continuously in the analog control mode even if the communication goes wrong in the digital control mode. The switching device may be operated manually or automatically. A display is preferably provided for informing the user of the abnormality of the communication.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
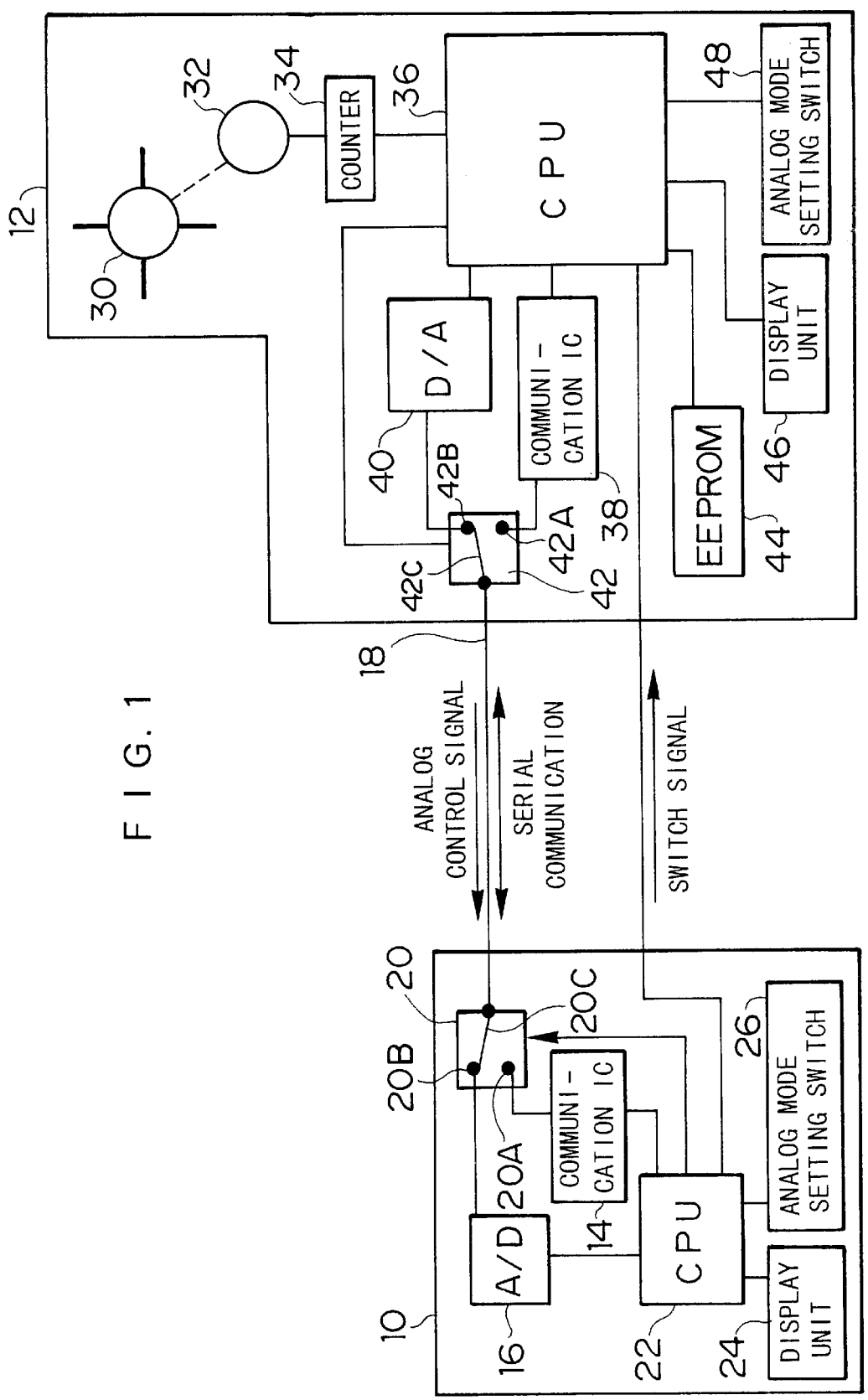
FIG. 1 is a block diagram showing the structure of a TV lens system according to an embodiment of the present invention.

FIG. 1 is a block diagram showing the structure of a TV lens system according to an embodiment of the present invention. The system comprises a lens apparatus (or a lens drive) 10 connected to a TV camera (not illustrated) and a control unit 12 for controlling the lens apparatus 10. The lens apparatus 10 includes a communication IC 14 for transmitting and receiving digital serial signals between the lens apparatus 10 and the control unit 12, and an A/D converter 16 for converting analog control signals received from the control unit 12 into digital signals. A signal transmission line 18 is switchably connected through a switch 20 to an input/output terminal 20A of the communication IC 14 or to an input terminal 20B of the A/D converter 16. In the switch 20, an armature 20C is switched according to control signals applied from a central processing unit (CPU) 22.

The lens apparatus 10 also includes a display unit 24 and an analog control mode setting switch 26. The display unit 24 may take a variety of forms such as a liquid crystal display (LCD) panel and a light emitting diode (LED). The display unit 24 may be built in the lens apparatus 10, or an existing display unit such as an electronic viewfinder of the TV camera (not illustrated) and a monitor for pictures captured by the TV camera may be used as the display unit 24. The analog control mode setting switch 26 is manually operated to set the TV lens system in an analog control mode. Turning on the switch 26 sets the entire system comprising the lens apparatus 10 and the control unit 12 into the analog control mode.

The control unit 12 comprises a control knob 30, a rotary encoder 32 and a counter 34, which determine the operated amount of the control knob 30, a CPU 36, a communication IC 38, a D/A converter 40, a switch 42, an EEPROM 44, a display unit 46 and an analog control mode setting switch 48. To determine the operated amount of the control knob 30, a potentiometer and an A/D converter may be used instead of the rotary encoder 32 and the counter 34.

The control unit 12 is detachably and electrically connected to the lens apparatus 10 or a TV camera body (not illustrated) through a connector (not illustrated) in such a manner as to enable the transmission of signals. The control unit 12 has a function for outputting analog control signals and a function for outputting digital control signals (digital operation signals) in serial communication in order to control such as the zoom, focus, iris, macro of the lens apparatus 10. Although the following description relates to the control knob 30 for controlling the focus, it also applies to other control knobs for controlling the zoom, iris, macro, and the like.

The rotary encoder 32 determines the rotated amount of the control knob 30, and the counter 34 counts encode pulses outputted from the rotary encoder 32. The counted results are sent to the CPU 36. The CPU 36 realizes the operated amount of the control knob 30, and outputs a signal (an operation signal) corresponding to the operated amount to the communication IC 38 and the D/A converter 40.

The CPU 36 outputs control signals for switching the contact of the switch 42 in order to connect the signal transmission line 18 with an input/output terminal 42A of the communication IC 38 or with an output terminal 42B of the D/A converter 40.

A description will now be given of the operation of the TV lens system that is constructed in the above-mentioned manner.

When a power supply is turned on in the state where the lens apparatus 10 is electrically connected to the control unit 12, the control unit 12 provides the lens apparatus 10 with a control system identification signal that indicates that the control unit 12 is suitable for the digital control system with the serial communication function. In accordance with the control system identification signal from the control unit 12, the CPU 22 of the lens apparatus 10 connects the armature 20C of the switch 20 to the input/output terminal 20A of the communication IC 14. Consequently, the lens apparatus 10 is set in the digital control mode.

The lens apparatus 10 may also provide the control unit 12 with the control system identification signal that indicates that the lens apparatus 10 is suitable for the digital control system. Upon receipt of the control system identification signal from the lens apparatus 10, the CPU 36 of the control unit 12 determines that the lens apparatus 10 is suitable for the digital control system, and connects the armature 42C of the switch 42 to the input/output terminal 42A of the communication IC 38. Consequently, the control unit 12 is also set in the digital control mode. The above sequence sets the TV lens system in the digital control mode. The data is transmitted between the lens apparatus 10 and the control unit 12 in the serial communication to thereby control the lens apparatus 10.

Figure 2:
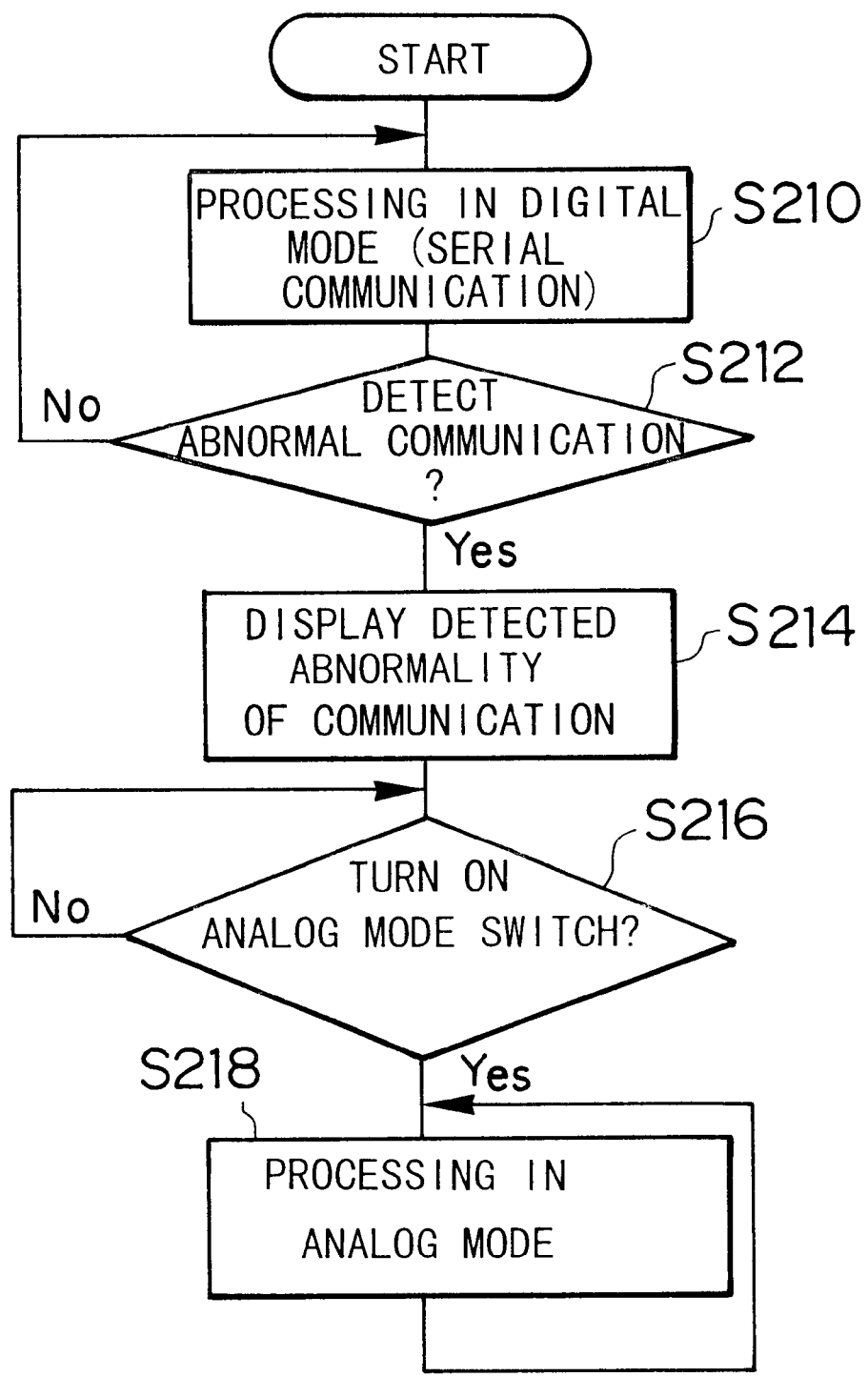
FIG. 2 is a flow chart showing the first example of a process for controlling the TV lens system.

FIG. 2 is a flow chart showing the first example of a process for controlling the TV lens system. When the TV lens system is turned on to start operating, the TV lens system is set in the digital control mode as described above (S210). After the setting of the digital control mode, the CPU 22 of the lens apparatus 10 and the CPU 36 of the control unit 12 monitor the intervals between pieces of the received data to determine whether the communication is normal or abnormal (S212). If the reception of the data stops for a predetermined time, or if there is an error in the received data, the CPU 22 and/or the CPU 36 determine that the communication is abnormal. If the serial communication is normal, the digital control mode is kept and the lens is controlled through the serial communication (S210–S212).

If the CPU 22 and/or the CPU 36 detect the communication being abnormal at S212, a warning of the abnormality of the communication is displayed on the display unit 24 of the lens apparatus 10 and/or the display unit 46 of the control unit 12 to inform the user of the abnormality of the communication (S214).

In response to the warning, the user switches the TV lens system to the analog control mode by operating one of the analog control mode setting switches 26 and 48. When the analog control mode setting switch 26 or 48 is turned on (S216), the CPU 22 of the lens apparatus 10 and the CPU 36 of the control unit 12 switch the connections of the switches 20, 42, respectively to change the digital control mode to the analog control mode (S218).

More specifically, when the user turns on the analog control mode setting switch 26 of the lens apparatus 10, the CPU 22 of the lens apparatus 10 outputs the signal to control the switch 20 to thereby connect the armature 20C of the switch 20 to the input/output terminal 20B of the A/D converter 16. The CPU 22 also outputs a switch signal to instruct the control unit 12 to switch to the analog control mode. In response to the switch signal from the lens apparatus 10, the CPU 36 of the control unit 12 outputs the control signal of the switch 42 and connects the armature 42C to the output terminal 42B of the D/A converter 40. Consequently, the TV lens system is switched from the digital control mode to the analog control mode. If the analog control mode setting switch 48 of the control unit 12 is turned on, the contacts of the switches 20, 42 of the control unit 12 and the lens apparatus 10 are switched so that the system is set in the analog control mode in the same manner. After the mode is changed to the analog control mode, the lens apparatus 10 can be controlled with the analog control system and this prevents the operation from becoming completely impossible.

Figure 3:
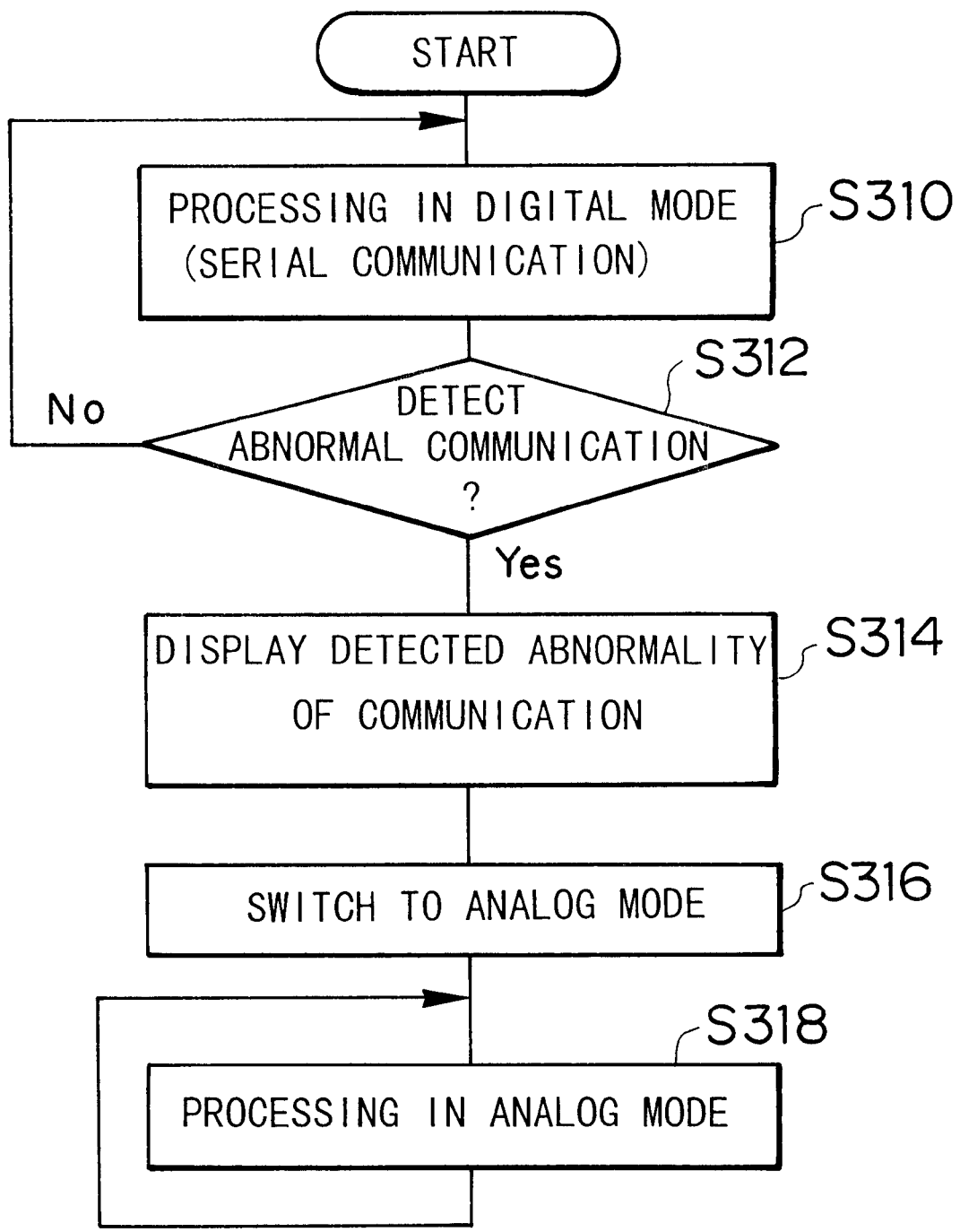
FIG. 3 is a flow chart showing the second example of a process for controlling the TV lens system.

FIG. 3 is a flow chart showing the second example of a process for controlling the TV lens system. When the TV lens system is turned on to start operating, the TV lens system is set in the digital control mode as described above (S310). After the setting of the digital control mode, the CPU 22 of the lens apparatus 10 and the CPU 36 of the control unit 12 monitor the intervals between the received data to determine whether the communication is normal or abnormal (S312). If the serial communication is normal, the digital control mode is kept and the lens is controlled through the serial communication (S310–S312).

If the CPU 22 and/or the CPU 36 detect the communication being abnormal at S312, a warning of the abnormality of the communication is displayed on the display unit 24 of the lens apparatus 10 and/or the display unit 46 of the control unit 12 to inform the user of the abnormality of the communication (S314). At the same time, the CPUs 22, 36 output the signals for controlling the switches 20, 42, respectively, so that the system can be switched to the analog control mode (S316). The display units 24 and/or 46 may display that the system has been switched to the analog control mode. Thereafter, the lens apparatus 10 is controlled in the analog control mode (S318).

Moreover, when the abnormal communication is detected in the serial communication, the information indicating the abnormality of the communication may be stored in a storage device such as the EEPROM 44, and the information may be provided to the user when the TV lens system is turned on again.

Figure 4:
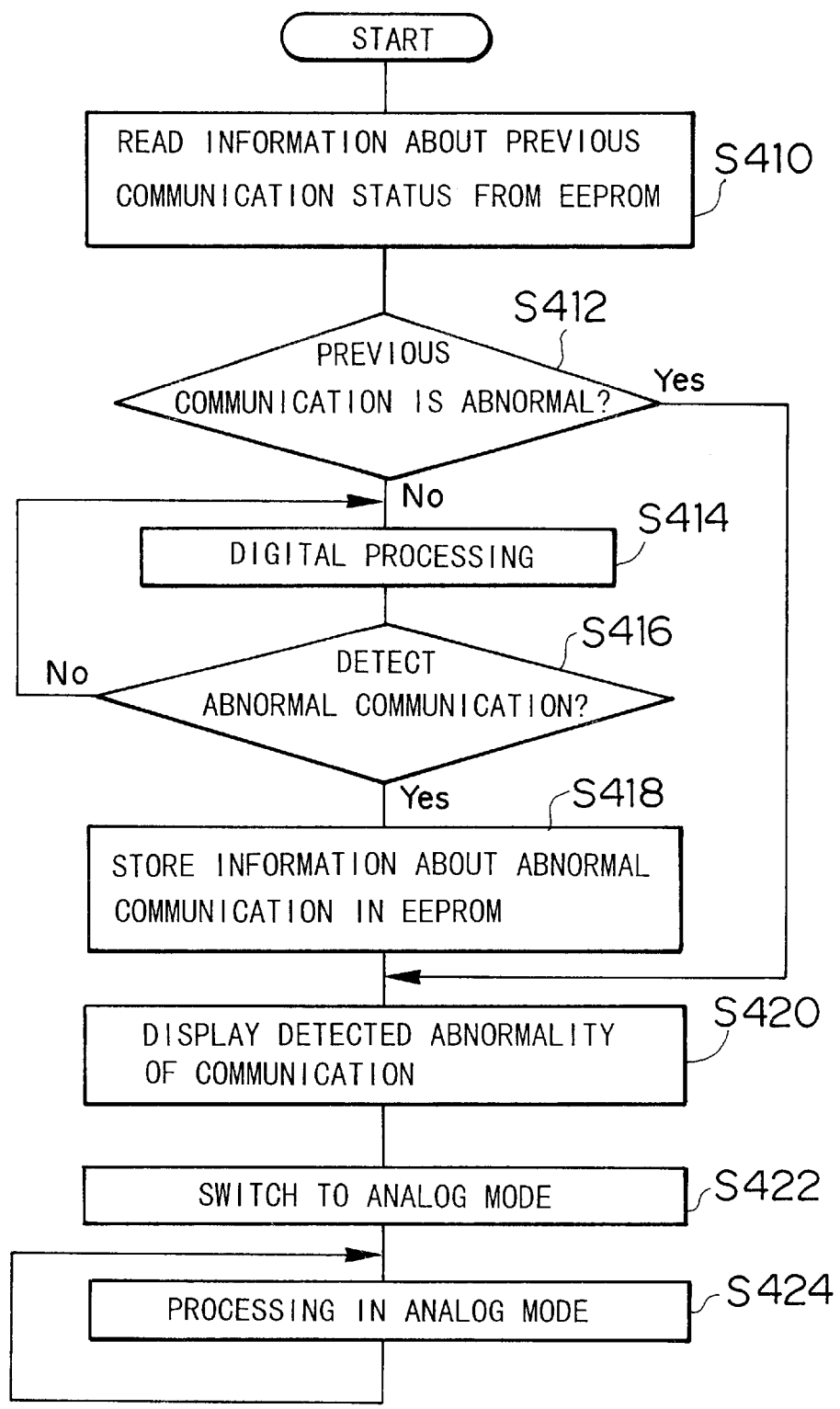
FIG. 4 is a flow chart showing the third example of a process for controlling the TV lens system.

FIG. 4 shows an example of the control process for storing the information indicating the abnormality of the communication and using it when the TV lens system restarts to operate afterward. When the TV lens system is turned on to start operating, the CPU 36 of the control unit 12 searches the information about the status of the previous communication from the EEPROM 44 (S410) and determines whether the previous communication is normal or abnormal (S412). If the previous communication is normal, the system is set in the digital control mode as described above and the lens apparatus 10 is controlled with the serial communication (S414). After the setting of the digital control mode, the CPU 22 of the lens apparatus 10 and the CPU 36 of the control unit 12 monitor the intervals between the received data and determine whether the present serial communication is normal or abnormal (S416). If the serial communication is normal, the digital control mode is kept and the lens is controlled through the serial communication (S414–S416).

If the CPU 22 and/or the CPU 36 detect the communication being abnormal at S416, the information indicating the abnormality of the communication is written in the EEPROM 44 (S418), and a warning of the abnormality of the communication is displayed on the display unit 24 of the lens apparatus 10 and/or the display unit 46 of the control unit 12 (S420).

Then, the system is automatically switched to the analog control mode (S422), and the display units 24 and/or 46 display that the system has been switched to the analog control mode. Thereafter, the lens apparatus 10 is controlled in the analog control mode (S424).

If the TV lens system is turned off after the information about the abnormality of the communication is written in the EEPROM 44 and then the TV lens system is turned on again, the previous serial communication is recognized as being abnormal at S412. Then, the process goes to S420. Thus, the analog control mode is set just after the TV lens system is turned on, so that the TV lens apparatus 10 can be controlled in the analog control mode. The information stored in the EEPROM 44 can be cleared after a repair or an inspection of the TV lens system.

In this embodiment, the lens apparatus 10 and the control unit 12 are provided with the display units 24 & 46 and the analog control mode setting switches 26 & 48, respectively; however, the present invention should not be restricted to this. It is possible to omit one of the display units 24 & 46 and one of the analog control mode setting switches 26 & 48.

In this embodiment, the control unit 12 is provided with the EEPROM 44, but the present invention should not be restricted to this. The lens apparatus 10 may be provided with an EEPROM.

In this embodiment, the system is composed of the lens apparatus 10 and the control unit 12, but the present invention may also be applied to a TV lens system that comprises a lens drive unit constructed independently of the lens apparatus. In this case, the "lens apparatus" may be replaced with the "lens drive unit" in the above description.

The present invention, in which the system is switched from the digital control mode to the analog control mode upon detection of the abnormal communication in the digital control mode in order to avoid the complete suspension of the system, may also be applied to the transmission of information between the TV camera body and the lens apparatus and the transmission of information between the TV camera body and the lens control unit.

As set forth hereinabove, the TV lens system of this invention monitors the status of the communication in the digital control mode. If the transmission of the digital signal becomes abnormal, the system is switched to the analog control mode. Thus, the lens can be controlled in the analog control mode if the digital control mode goes wrong. This prevents the operation of the lens from becoming completely impossible due to a trouble in the digital control mode.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A TV lens system, comprising:
   a lens drive that drives a TV lens apparatus, the lens drive operating in control modes including an analog control mode and a digital control mode;
   a communication monitor that monitors communication of the lens drive in the digital control mode; and
   a switching device that switches the control modes of the lens drive from the digital control mode to the analog control mode if the communication monitor detects the communication being abnormal.

2. The TV lens system as defined in claim 1, further comprising an abnormality display that displays abnormality of the communication if the communication monitor detects the communication being abnormal.

3. The TV lens system as defined in claim 2, further comprising:
   a storage device that stores abnormality information indicating the abnormality of the communication if the communication monitor detects the communication being abnormal; and
   an abnormality information searching device that searches the storage device for the abnormality information when the TV lens system starts to operate;
   wherein the abnormality display displays the abnormality of the communication if the abnormality information searching device detects the abnormality information.

4. The TV lens system as defined in claim 3, wherein the switching device selects the analog control mode if the abnormality information searching device detects the abnormality information.

5. The TV lens system as defined in claim 3, wherein the abnormality information is cleared from the storage device when the abnormality of the communication is repaired.

6. The TV lens system as defined in claim 1, further comprising:
   a storage device that stores abnormality information indicating abnormality of the communication if the communication monitor detects the communication being abnormal; and
   an abnormality information searching device that searches the storage device for the abnormality information when the TV lens system starts to operate;
   wherein the switching device selects the analog control mode if the abnormality information searching device detects the abnormality information.

7. The TV lens system as defined in claim 6, wherein the abnormality information is cleared from the storage device when the abnormality of the communication is repaired.

8. The TV lens system as defined in claim 1, wherein at least one of the communication monitor and the switching device is incorporated in the lens drive.

9. The TV lens system as defined in claim 1, further comprising the TV lens apparatus, the lens drive being incorporated in the TV lens apparatus.

10. The TV lens system as defined in claim 1, further comprising the TV lens apparatus, at least one of the communication monitor and the switching device being incorporated in the TV lens apparatus.

11. The TV lens system as defined in claim 1, further comprising a lens control unit that controls the lens drive, at least one of the communication monitor and the switching device being incorporated in the lens control unit.

12. A lens control unit used in the TV lens system as defined in claim 11.

13. The TV lens system as defined in claim 1, wherein the switching device is manually operatable.

14. The TV lens system as defined in claim 1, wherein the switching device automatically switches the control modes from the digital control mode to the analog control mode upon detection of the abnormal communication by the communication monitor.

15. A TV lens system, comprising:
   a TV lens apparatus that operates in control modes including an analog control mode and a digital control mode;
   a communication monitor that monitors communication of the TV lens apparatus in the digital control mode; and
   a switching device that switches the control modes of the TV lens apparatus from the digital control mode to the analog control mode if the communication monitor detects the communication being abnormal.

16. The TV lens system as defined in claim 15, further comprising an abnormality display that displays abnormality of the communication if the communication monitor detects the communication being abnormal.

17. The TV lens system as defined in claim 16, further comprising:
   a storage device that stores abnormality information indicating the abnormality of the communication if the communication monitor detects the communication being abnormal; and
   an abnormality information searching device that searches the storage device for the abnormality information when the TV lens system starts to operate;
   wherein the abnormality display displays the abnormality of the communication if the abnormality information searching device detects the abnormality information.

18. The TV lens system as defined in claim 17, wherein the switching device selects the analog control mode if the abnormality information searching device detects the abnormality information.

19. The TV lens system as defined in claim 17, wherein the abnormality information is cleared from the storage device when the abnormality of the communication is repaired.

20. The TV lens system as defined in claim 15, further comprising:
   a storage device that stores abnormality information indicating abnormality of the communication if the communication monitor detects the communication being abnormal; and
   an abnormality information searching device that searches the storage device for the abnormality information when the TV lens system starts to operate;
   wherein the switching device selects the analog control mode if the abnormality information searching device detects the abnormality information.

21. The TV lens system as defined in claim 20, wherein the abnormality information is cleared from the storage device when the abnormality of the communication is repaired.

22. The TV lens system as defined in claim 15, wherein at least one of the communication monitor and the switching device is incorporated in the TV lens apparatus.

23. The TV lens system as defined in claim 15, further comprising a lens control unit that controls the TV lens apparatus, at least one of the communication monitor and the switching device being incorporated in the lens control unit.

24. A lens control unit used in the TV lens system as defined in claim 23.

25. The TV lens system as defined in claim 15, wherein the switching device is manually operatable.

26. The TV lens system as defined in claim 15, wherein the switching device automatically switches the control modes from the digital control mode to the analog control mode upon detection of the abnormal communication by the communication monitor.

* * * * *